(12) United States Patent
Laporte et al.

(10) Patent No.: US 7,419,641 B2
(45) Date of Patent: Sep. 2, 2008

(54) MULTIPLE-CHAMBER DEVICE FOR FRACTIONATED EVAPORATION AND SEPARATION OF A SOLUTION

(75) Inventors: Franck Laporte, Saint Clement de Riviere (FR); Rene-Pierre Ducret, Sassenage (FR); Carmen Jimenez Nicollin, Grenoble (FR); Jean-Emmanuel Decams, Montpellier (FR); Benoit Pierret, Meylan (FR); Herve Guillon, Montpellier (FR)

(73) Assignee: Joint Industrial Processors for Electronics, Noyen sur Sarthe (FR)

( * ) Notice: Subject to any disclaimer, the term of this patent is extended or adjusted under 35 U.S.C. 154(b) by 828 days.

(21) Appl. No.: 10/486,520

(22) PCT Filed: Aug. 27, 2002

(86) PCT No.: PCT/FR02/02942

§ 371 (c)(1),
(2), (4) Date: Feb. 12, 2004

(87) PCT Pub. No.: WO03/018161

PCT Pub. Date: Mar. 6, 2003

(65) Prior Publication Data

US 2004/0234418 A1    Nov. 25, 2004

(30) Foreign Application Priority Data

Aug. 28, 2001    (FR)    ................................ 01 11161

(51) Int. Cl.
    *B01L 3/00*    (2006.01)
(52) U.S. Cl. .................. 422/101; 422/99; 422/100; 118/726; 427/255.6; 436/180

(58) Field of Classification Search ........... 422/99–101; 118/726; 427/255.6; 436/177, 180
See application file for complete search history.

(56) References Cited

U.S. PATENT DOCUMENTS

| 4,740,298 | A | * | 4/1988 | Andresen et al. ......... 210/198.3 |
| 4,824,792 | A | * | 4/1989 | Thorpe et al. ............... 436/177 |
| 5,446,263 | A | * | 8/1995 | Eigen et al. ................. 219/521 |
| 5,776,254 | A | * | 7/1998 | Yuuki et al. ................. 118/725 |
| 6,007,330 | A | * | 12/1999 | Gauthier ....................... 432/47 |
| 6,123,993 | A | * | 9/2000 | Xu et al. .................. 427/255.6 |
| 6,245,151 | B1 | * | 6/2001 | Bhandari et al. ............ 118/726 |

FOREIGN PATENT DOCUMENTS

| FR | 2 800 754 | 5/2001 |
| GB | 1 224 057 | 3/1971 |

* cited by examiner

*Primary Examiner*—Jill Warden
*Assistant Examiner*—Jyoti Nagpaul
(74) *Attorney, Agent, or Firm*—Oliff & Berridge, PLC

(57) ABSTRACT

A device for evaporation of a solution based on solvent and compounds or solutes inside an enclosure comprises different evaporation zones separated by separating partitions into several distinct elementary chambers enabling fractionated evaporation via outlets generating a plurality of separate vapor flows specific to each constituent. The solution is injected into the first chamber subjected to the lowest temperature so as to impregnate a porous mobile element that passes through the different partitions, being successively in contact with said chambers heated to increasing temperatures. A neutral carrier gas is injected in the vicinity of the partitions for control of the pressure losses of the gas flows between the different chamber.

11 Claims, 8 Drawing Sheets

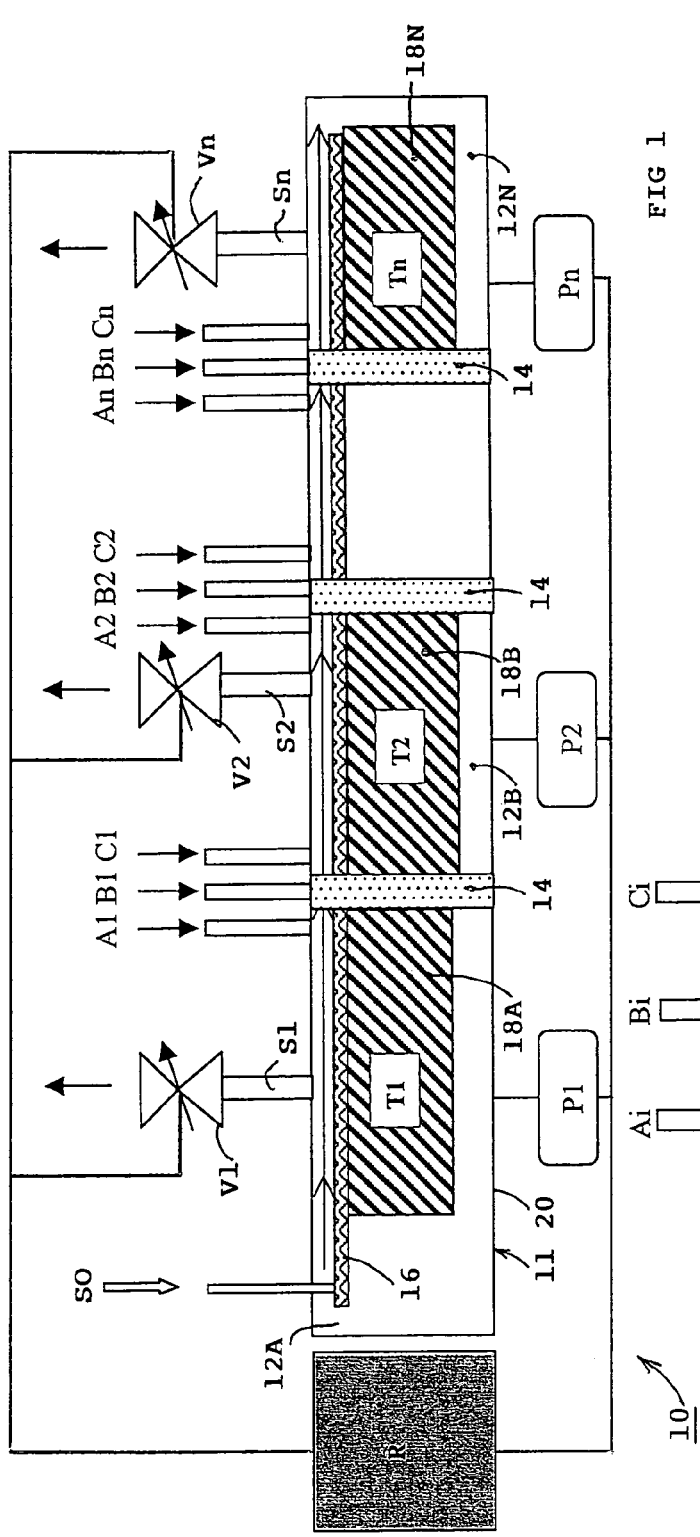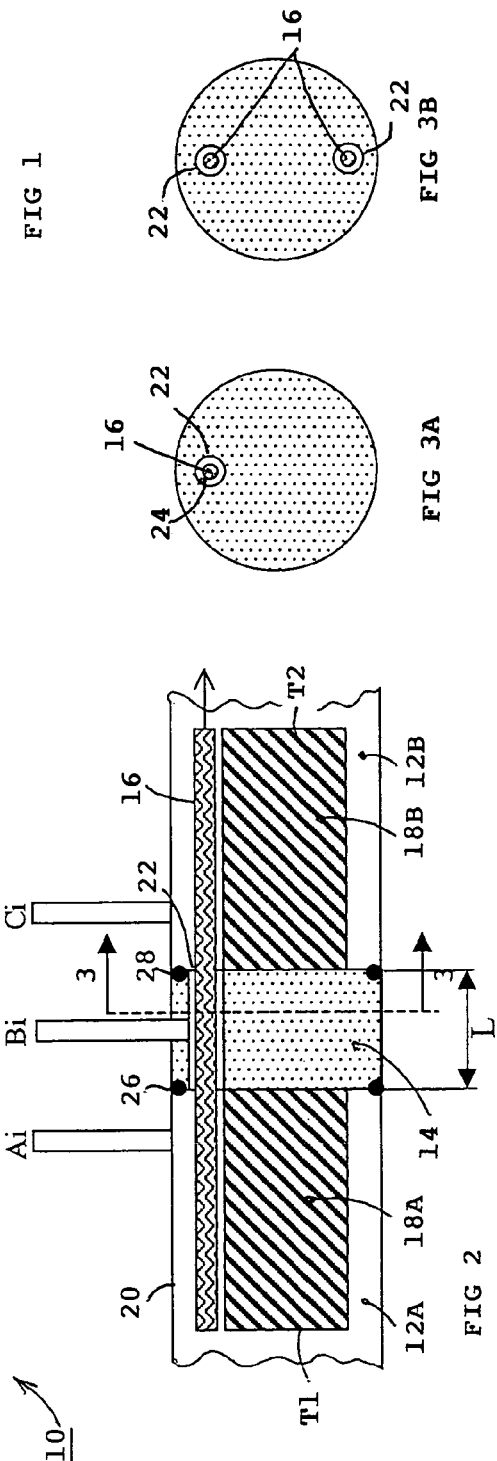
FIG 1
FIG 2
FIG 3A
FIG 3B

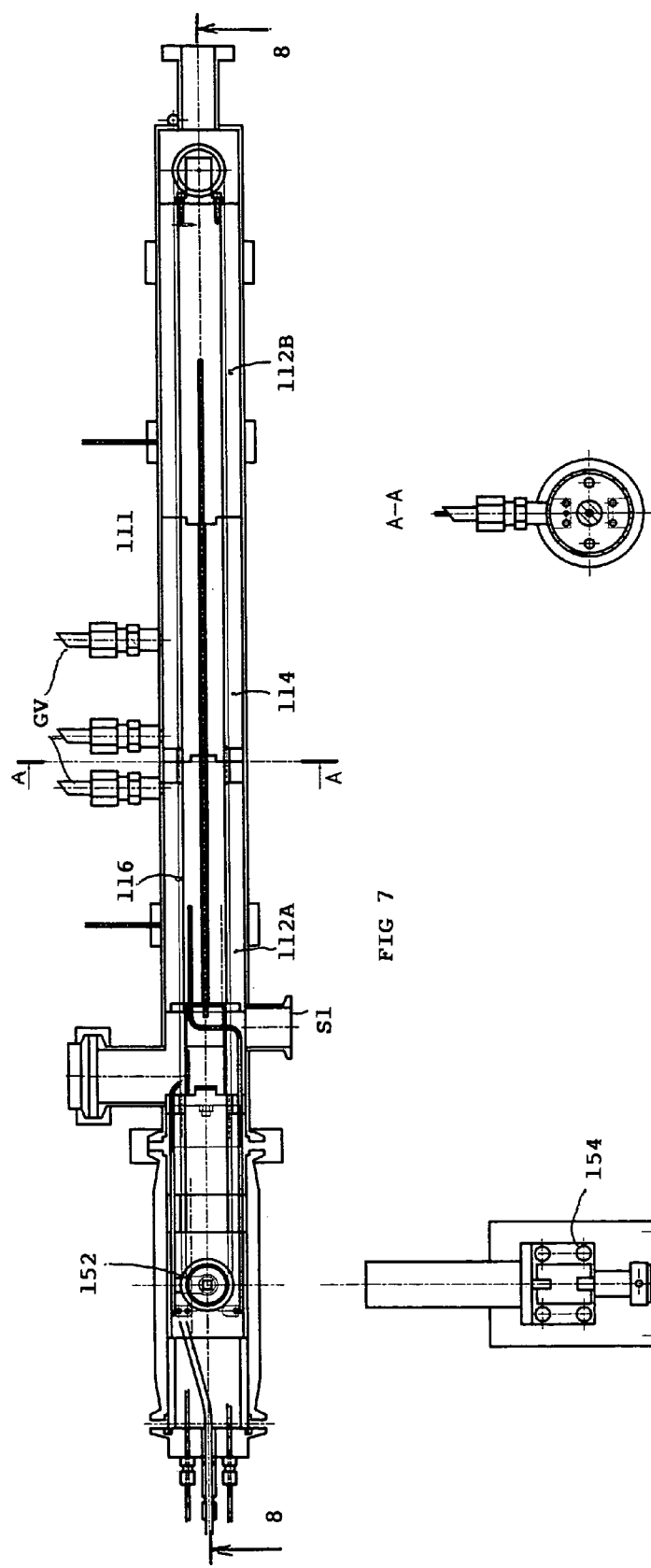
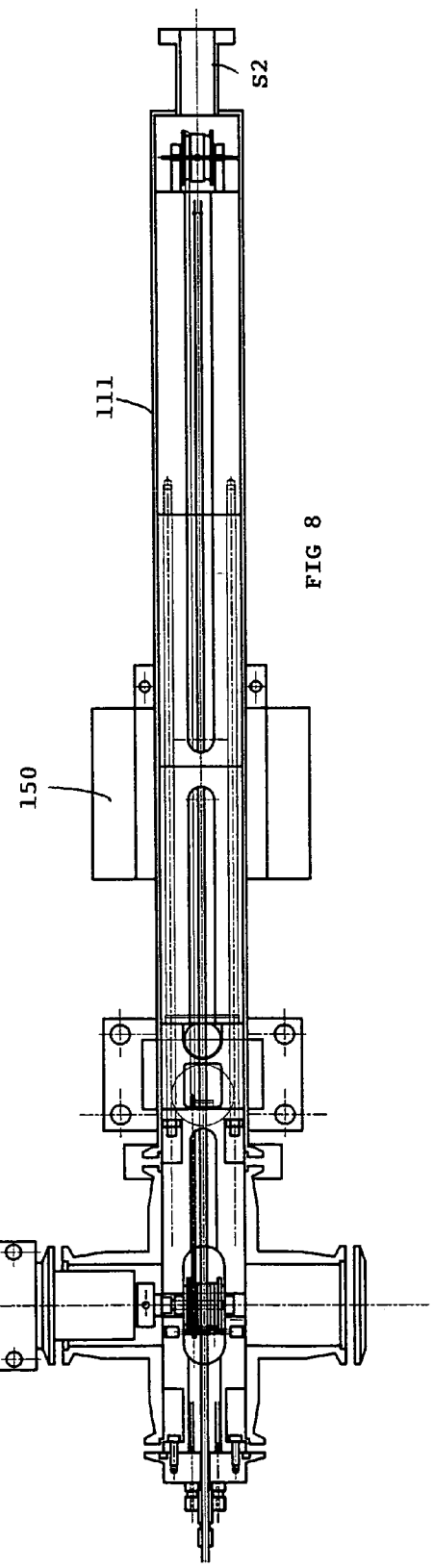
FIG 7
FIG 8

US 7,419,641 B2

MULTIPLE-CHAMBER DEVICE FOR FRACTIONATED EVAPORATION AND SEPARATION OF A SOLUTION

BACKGROUND OF THE INVENTION

The invention relates to a device for evaporation of a liquid solution based on solvent and compounds or solutes inside an enclosure containing:

evaporation zones at different temperatures which correspond to the respective evaporation temperatures of the n constituents of the solution, and means for separating the vapors of the solvent and of the compounds.

STATE OF THE ART

Known systems enable only the vapors mixture resulting from evaporation of the solution [organic solvent vapors+ dissolved liquid or solid organometallic CVD precursor vapors] to be sent to the chamber. For CVD applications, the solvent vapors can prove troublesome.

Another known device concerns evaporation of a solution composed of a solvent and solutes inside a single enclosure in two distinct evaporation zones at different temperatures and with separation of the solvent vapors and of the solute vapors. A single evaporation enclosure is used, which makes efficient separation of the vapors difficult or even impossible as there is no pressure loss for flow of the gases between the two evaporation zones.

OBJECT OF THE INVENTION

The object of the invention is to achieve a fractionated evaporation device enabling efficient separation of the constituents of a solution based on solvent and compounds or solutes.

The device according to the invention is characterized in that:

the different evaporation zones are separated by separating partitions into several distinct elementary chambers enabling fractionated evaporation via outlets generating a plurality of separate flows of vapor specific to each constituent, the solution is injected into a first chamber subjected to the lowest temperature so as to impregnate a porous mobile element that passes through the different partitions, being successively in contact with said chambers heated to increasing temperatures, and means for injecting a neutral carrier gas in the vicinity of the partitions for control of the pressure losses of the gas flows between the different chambers.

According to one feature of the invention, the porous mobile element is made of refractory material which keeps its mechanical properties up to the maximum temperature. It is formed by a coiled spiral spring closed on itself to form a loop driven cyclically by a motor.

According to another feature of the invention, each chamber is equipped with a heating unit and with an outlet per constituent. The pressure in each chamber is controlled by a pressure control system operating in conjunction with pressure reading gauges inside the chambers, and variable opening valves placed on the outlets.

According to another feature of the invention, the metal enclosure is made of stainless steel or aluminum, and the separating partitions are made of thermal insulating material each having a hole for the mobile element to pass through. In the case where the mobile element moves in cyclic manner, each separating partition has two holes for passage of the mobile element (one for the forward direction and the other for the return). The means for injecting the carrier gas comprise inlet ducts to distribute the gas flows between the different chambers, the pressure losses depending on the width of the partitions and on the differential section corresponding to the clearance between the hole and the mobile element.

The external part of the evaporator enclosure can be equipped with a heat exchanger to prevent heat transfer between the different chambers.

In the case of a CVD application where the solution contains a solvent and a precursor, the outlet of the first chamber heated to ambient temperature conducts the evaporated solvent to a condensation system, whereas the outlet of the second chamber heated to a higher temperature sends the evaporated precursors to the CVD reactor.

BRIEF DESCRIPTION OF THE DRAWINGS

Other advantages and features will become more clearly apparent from the following description of an embodiment of the invention, given as a non-restrictive example only and represented in the accompanying drawings, in which:

FIG. 1 is a schematic view of the multiple-chamber evaporator-separator device according to the invention;

FIG. 2 shows a partial view of FIG. 1 on an enlarged scale, representing the carrier gas injection system;

FIG. 3A is a cross-sectional view along the line 3-3 of FIG. 2, and FIG. 3B shows a variant of FIG. 3A;

FIG. 7 illustrates a longitudinal sectional view of a preferred embodiment corresponding to the diagram of FIG. 4;

FIG. 8 is a cross-sectional view along the line 8-8 of FIG. 7;

DESCRIPTION OF A PREFERRED EMBODIMENT

Figure 4:
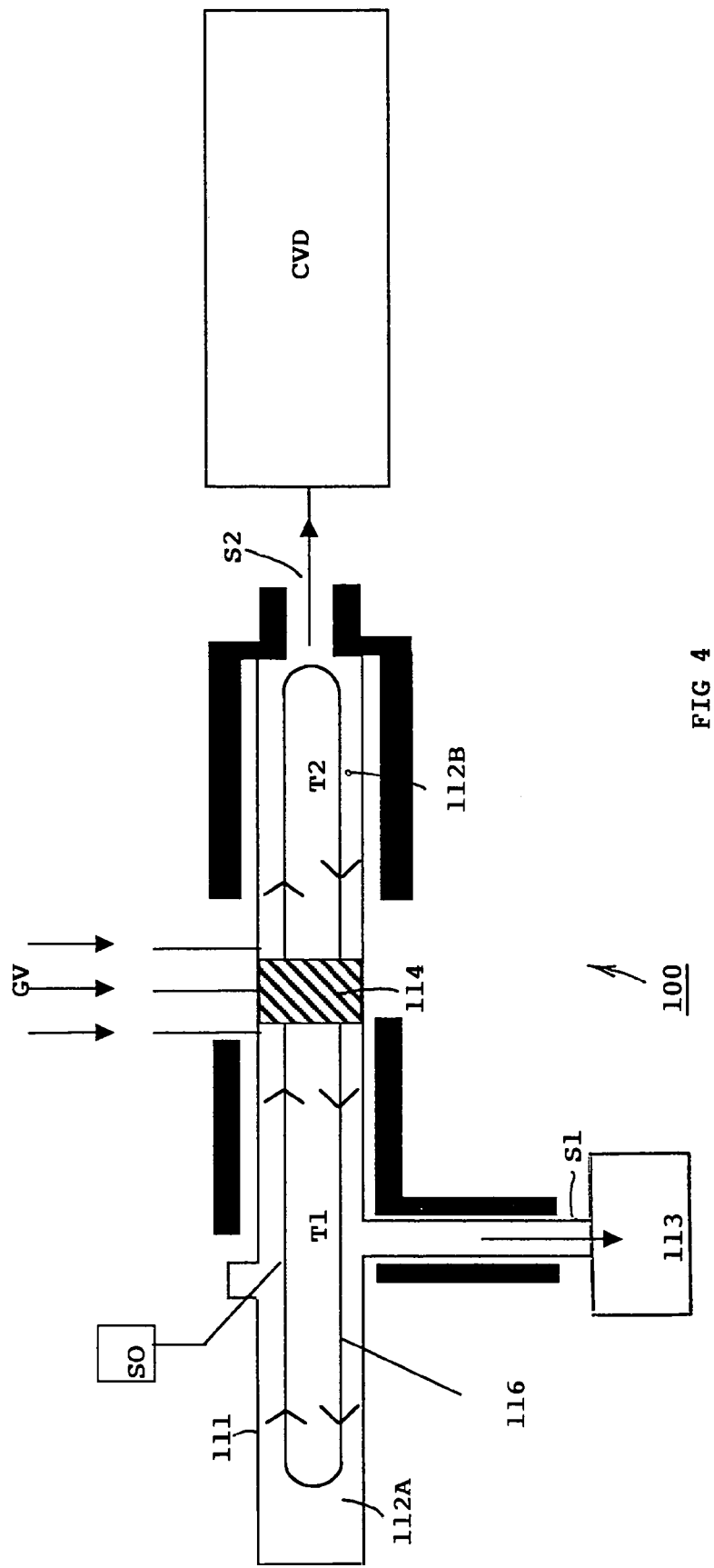
FIG. 4 is a schematic view of the evaporator-separator device with two chambers suitable for a CVD application.

With reference to FIGS. 1 to 3A, an evaporator-separator device designated by the general reference 10 comprises an enclosure 11 divided into several elementary chambers 12A, 12B . . . 12N separated from one another by intermediate partitions 14 with control of the pressure losses for the gas flow. It is a system with multiple evaporation zones and chambers wherein the solution SO to be evaporated is composed of at least one liquid (solvent formed by an organic or organometallic compound) and one or more other solid or liquid compounds (organic or organometallic solutes) soluble in the solvent.

The solution SO is injected into the first chamber 12A of the evaporator-separator device 10 which is located in a cold zone at ambient temperature. The solution SO impregnates a porous and refractory mobile element 16 of large surface which keeps its mechanical properties up to a maximum temperature Tn. The mobile element 16 charged with solution SO then passes successively through the partitions 14 separating the chambers 12A, 12B, ... 12N being in contact with n zones heated to increasing temperatures T1, T2, ... Tn which are the respective evaporation temperatures of the n constituents of the solution. The successive temperatures T1, T2, ... Tn are obtained by heating units 18A, 18B, ... 18N located in the corresponding chambers 12A, 12B, ... 12N.

The mobile element 16 transits as close as possible to the heating units 18A, 18B, ... 18N, and each evaporation zone of the chambers 12A, 12B, ... 12N comprises an outlet S1, S2, ... Sn per constituent. The evaporator-separator device 10 therefore generates a plurality of separate vapor flows.

The pressure in each evaporation zone has to be controlled. A pressure control system can be used for this purpose comprising for each evaporation zone a pressure reading gauge P1, P2, ... Pn fitted on the corresponding chamber 12A, 12B, ... 12N, and a variable opening valve V1, V2, ... Vn placed on the corresponding outlet S1, S2, ... Sn. A control unit R electrically connected to the valves V1, V2, ... Vn and to the different gauges P1, P2, ... Pn enables valve opening orders to be transmitted so that the different pressure setpoints can be reached.

For optimum operation of the device, the sharpest temperature transition possible has to be made between each evaporation zone, and pressure losses be produced for the gas flows between the zones (FIGS. 2 and 3). These pressure losses depend on the width L of the partition 14 and on the differential section 24 corresponding to the clearance for passage of the mobile element 16 in the partition 14. It is also necessary to prevent heating of one zone influencing the temperature of the neighboring zone or zones, i.e. each zone has to be thermally insulated from the adjacent zones. The heating units 18A, 18B, ... 18N and the wall 20 of the chambers 12A, 12B, ... 12N are preferably made of stainless steel or aluminum.

The heating means can be fitted inside the heating units 18A, 18B, ... 18N or outside around the wall 20 of the enclosure 11. For the internal thermal insulation, the intermediate partitions 14 are made of a thermal insulating material that does not release particles, such as teflon (PTFE) for example. The partitions 14 are provided with at least one communication hole 22 to let the mobile element 16 pass from one zone to the other. For the external thermal insulation, any type of thermal insulating material can be used. The differential section 24 corresponds to the difference between the cross-section of the hole 22 and that of the mobile element 16. In FIG. 3B, each partition 14 is provided with two holes 22 for looped cyclic circulation of the mobile element 16.

To improve the thermal profile of the evaporator-separator device even further, heat exchangers (not shown) fixed onto the outside wall 20 can be fitted between each zone.

These heat exchangers are designed to prevent heat transfer from one zone to the other via the external metal wall 20.

To improve the vapor flow distribution between the different outlets S1, S2, ... Sn, a neutral carrier gas (nitrogen, argon, helium ... ) is injected at the level of each separating partition 14. Each carrier gas injection line is equipped with a flowrate control system. Injection (FIG. 2) can be performed via three distinct inlet ducts Ai, Bi and Ci according to the following combinations: Ai, Bi, Ci, Ai+Bi, Ai+Ci, Bi+Ci or Ai+Bi+Ci. To force the passage of the carrier gas from one zone to the other through the differential section 24, it is preferable to minimize the space between the partitions 14 and the internal face of the wall 20. A pair of O-rings 26, 28 enable this space to be reduced to zero.

Input of the solution SO into the chamber 12A must be controlled, notably by use for example of the following liquid injection systems: automobile injector, liquid mass regulating flowmeter, syringe, dosing micro-pumps, ultrasound spray nozzle .... Injection of the solution SO can be performed in pulsed or continuous manner.

In an alternative embodiment of the device, there are only p evaporation zones and associated vapor outlets (with p<n) whereas the solution SO contains n constituents to be evaporated, for certain constituents may have evaporation temperatures close to one another and therefore evaporate in the same zone. This device is advantageous for certain applications designed to make a mixture of vapors flow through one or more of the outlets.

In another alternative embodiment of the device, there are several porous and refractory mobile elements 16 supplied by independent liquid injection systems.

In the case where the mobile elements 16 are supplied by a solution of the same composition, this device can advantageously be used to obtain large vapor flows on each vapor outlet.

In the case where the mobile elements 16 are supplied by solutions of different compositions, this device can advantageously be used:

Either to send via the same vapor outlet at least two compounds that are not mixable in solution (reaction in solution, insolubility ... ).

Or to send via the same vapor outlet one or more compounds with a constant vapor flowrate (i.e. a constant solution flowrate at a given concentration), and one or more compounds with a variable vapor flowrate (i.e. a variable solution flowrate at a given concentration).

A few examples of use of the present invention are given hereafter:

EXAMPLE 1

Separation and Purification of Compounds Forming a Liquid Mixture

Two or more volatile compounds (isomers for example) can be formed in solution and crystallize at the same time from this solution. Crystallization is therefore not a means of separating these compounds. Fractionated sublimation of the mixture of the solid compounds resulting from crystallization is not always possible. Purification by sublimation is in fact mainly performed under fairly low pressure (0.1 to 0.001 Mbar), which brings the vaporization temperatures of the compounds closer to one another preventing efficient separation thereof. The present invention makes it possible to work at much higher pressures (1 Mbar up to atmospheric pressure) for evaporation of solids, which enables sufficient differences to be kept in the evaporation temperatures to achieve efficient separation.

EXAMPLE 2

Device for Evaporating CVD Precursors in Solution without Sending Solvent Vapors into the Chemical Deposition Chamber in Vapor Phase In CVD applications, a solution [organic solvent+organometallic precursor(s)] is injected into an evaporator and enables reproducible and stable evaporation of thermally unstable compounds with low vapor tension. The compound to be evaporated is in fact deposited in the evaporator on the mobile element 16 on a large surface (favorable for evaporation) and remains at ambient temperature so long as it is not injected into the evaporator.

However, known systems enable only the mixture of vapors resulting from evaporation of the solution [organic solvent vapors+dissolved liquid or solid organometallic CVD precursor vapors] to be sent to the chamber. For CVD applications, the device according to the present invention enables only the liquid or solid organometallic CVD precursor vapors to be sent selectively to the CVD reactor. The solvent vapors which may be troublesome are sent to an outlet which is not connected to the CVD reactor.

The presence of organic solvent (by definition rich in carbon) in the CVD chamber gives rise to problems when carbon-free depositions are to be obtained. It is also inconvenient in the case of depositions at reduced pressure and high temperature in an oxidizing atmosphere, as it may lead to formation of undesirable carbonates (case for example of depositions containing alkaline-earths and/or lanthanides) The presence of the solvent in the CVD chamber for depositions in an oxidizing atmosphere ($O_2$, $O_3$, $N_2O$, $H_2O$ . . . ) and at a pressure close to atmospheric pressure may lead to creation of an explosive thermal decomposition regime in the CVD chamber (similar to what happens in an internal combustion engine).

A preferred embodiment of the present invention for applications of example 2 is described in detail below.

FIG. 4 presents a general operating diagram of the evaporator-separator device for CVD applications.

The device 100 is formed by a longitudinal enclosure 111 subdivided into two chambers 112A, 112B heated at two different temperatures which correspond to evaporation of the organic solvent and or the liquid or solid organometallic CVD precursor(s). The two chambers 112A, 112B are separated by an internal partition 114 made of thermal insulating material. The liquid or solid organometallic CVD precursor(s) are dissolved in a carrier liquid (organic solvent) and the solution SO is injected into the chamber 112A in controlled manner onto the mobile element 116 which circulates cyclically inside the enclosure 111.

The mobile element 116 charged with solution SO moves through the two chambers 112A, 112B. In the first chamber 112A heated to a temperature T1, the solvent is evaporated and directed to a first outlet S1. The solvent vapors can thus be recovered using a condensation system 113 or cold trap, the internal walls whereof are at a temperature lower than T1. The second chamber 112B is heated to a temperature T2, higher than T1, where the precursor or precursors are evaporated and sent through a line heated at T2 to the outlet S2 connected to a CVD reactor.

Figure 5:
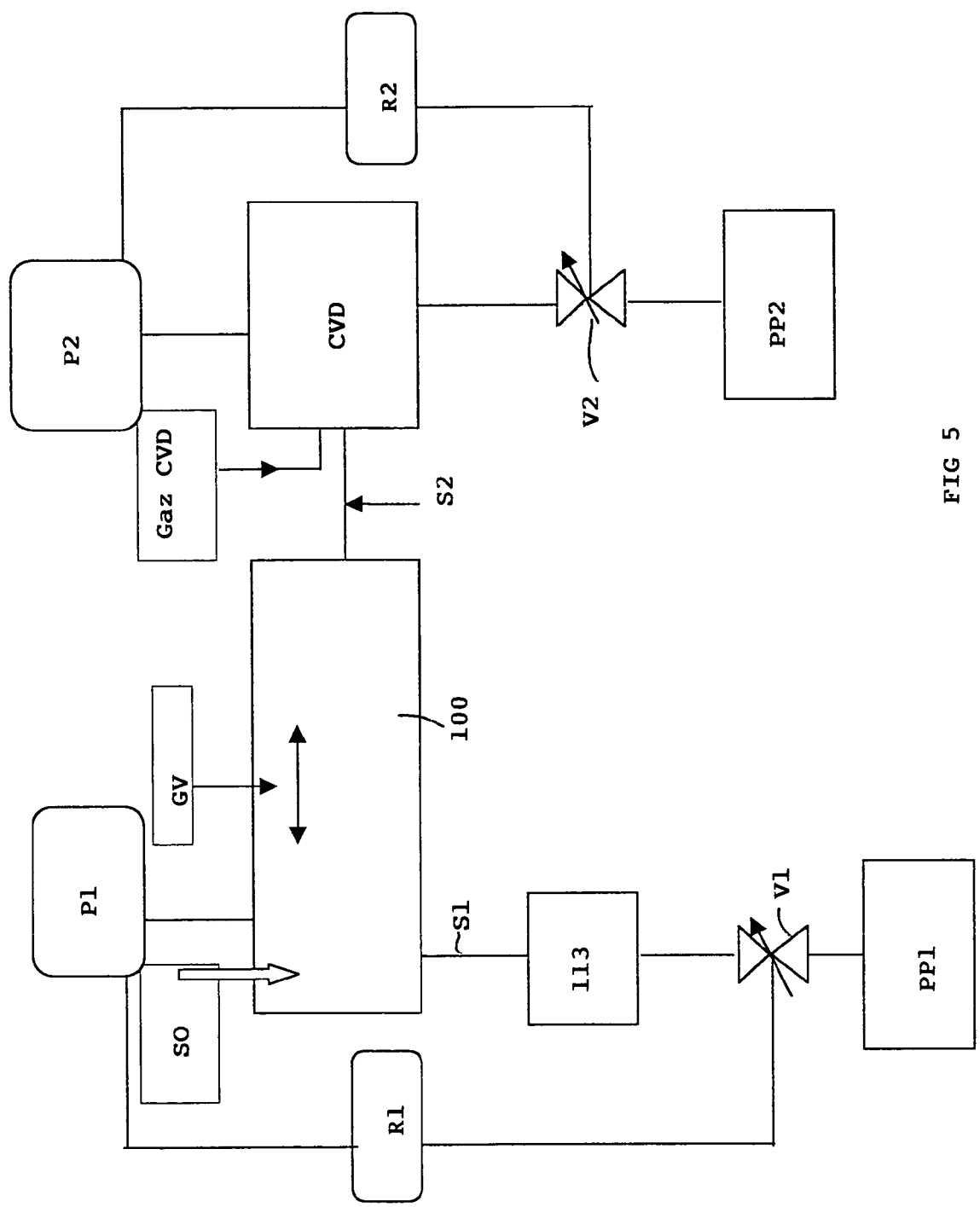
FIG. 5 represents a synoptic diagram of the device of FIG. 4 with the pressure control system.

With reference to FIG. 5, the condensation system 113 for the solvent and CVD reactor have to be equipped with a pumping system PP1, PP2 or with a vent which enables a flow of vapors from the evaporator-separator device 100 to the condensation system 113 and to the CVD reactor to be created through the outlets S1 and S2.

The evaporator-separator device 100 can operate in a vacuum or at atmospheric pressure. In the case of pressures lower than atmospheric pressure, two pressure control systems R1, R2 are required, one R1 being assigned to the evaporation device 100 and the other R2 for the CVD reactor deposition chamber. The pressure in the first chamber 112A (at T1) can be the same as or different from the pressure in the CVD reactor. To direct the solvent and precursor vapors to the respective outlets S1 and S2, one or more carrier gas GV lines are used. The device is equipped with a means for driving and guiding the mobile element 116 enabling its cyclic movement in the evaporator 100.

The use of several mobile elements 116 in parallel supplied by different liquid lines is necessary in the case of CVD precursors not mixable in solution. Evaporation of the precursors takes place at the level of a single outlet from several mobile elements, and mixing of the precursors then only takes place in the vapor phase (case of multiple-element CVD depositions). The use of a mobile element 116 per precursor also enables multiple-element layers with composition gradient to be deposited. In the course of the deposition phase for certain precursors, the solution flowrate (which has a constant concentration) is made to vary independently from the flowrates of the solutions of the other precursors. These flowrate variations can be regular and progressive or by successive steps.

In certain CVD processes where multi-metal materials are deposited, it is not possible to evaporate the precursors at the same temperature, as some of them decompose thermally at the evaporation temperature of the others.

Figure 6:
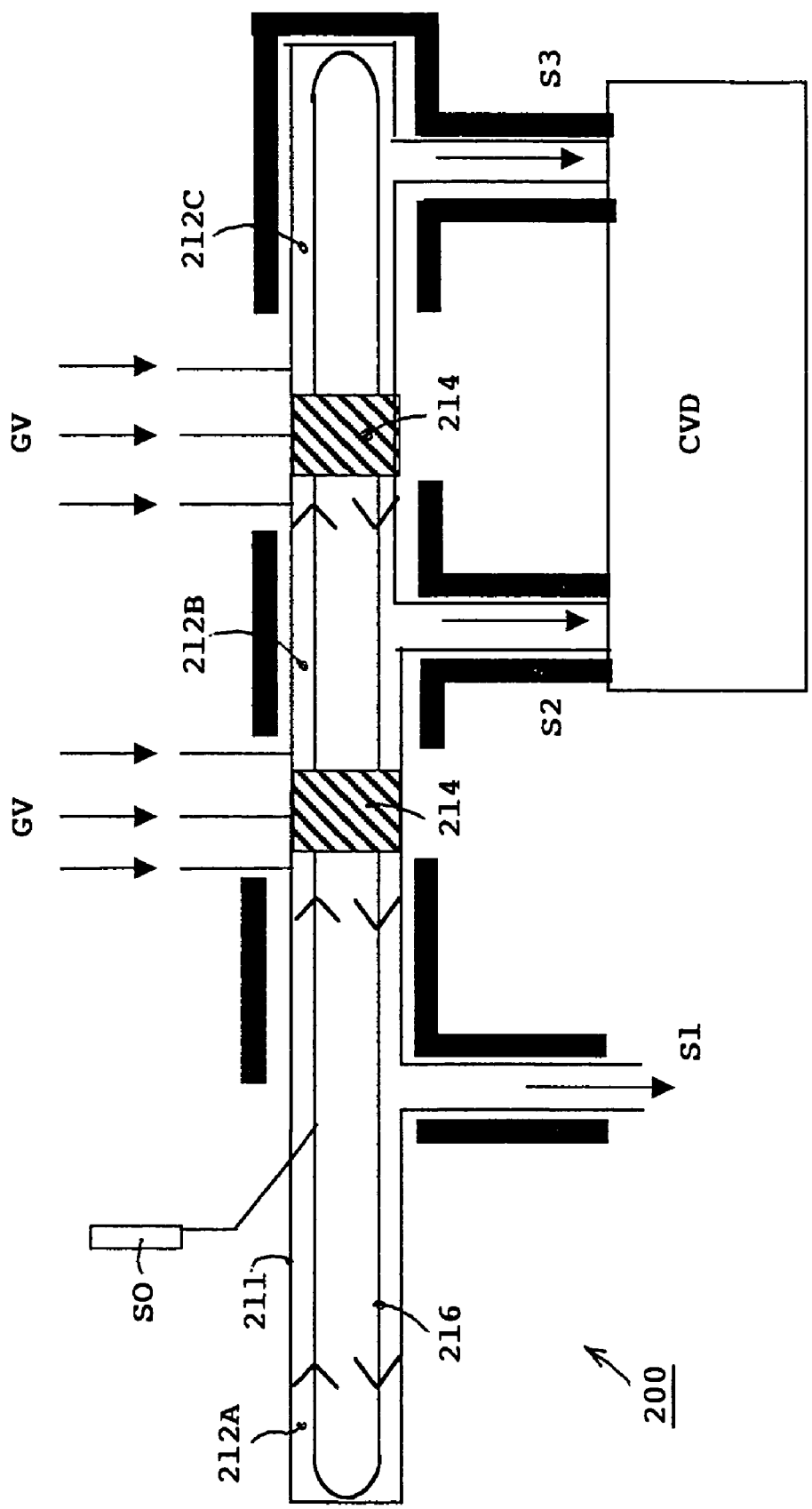
FIG. 6 shows a variant of the device of FIG. 4 with three chambers.

In FIG. 6, an evaporator 200 has three chambers 212A, 212B, 212C separated by partitions 214, the chambers being at the temperatures T1, T2, T3. In the least favorable case, if there are n CVD precursors, an evaporator with n+1 outlets has to be used (one outlet for the solvent and n for the CVD precursors). The n CVD precursor outlets are connected to the same CVD reactor by n distinct lines respectively heated at T1, T2, T3, . . . Tn which are the evaporation temperatures of the n precursors.

In the case of the use of CVD precursors which are adducts (covalent molecular organometallic complexes with one or more Lewis bases solvated neutrally on the metal), it may be desirable to eliminate the Lewis base or bases in addition to the solvent (if they are organic, i.e. carbonated) and only send the desolvated covalent molecular organometallic complexes (from which the Lewis bases have been extracted) to the CVD reactor.

In this case, the evaporator 200 of FIG. 6 has to be used. The first chamber 212A of the enclosure 211 is used for evaporation of the solvent, a second chamber 212B for solvent extraction of the adducts, and a third chamber 212C for evaporation of the CVD precursors.

In the case of use of several adducts, several chambers can be used for solvent extraction of the adducts and for evaporation of the CVD precursors according to the solvent extraction temperatures of the adducts and the evaporation temperatures of the precursors.

FIGS. 7 and 8 show a preferred embodiment of the device of FIG. 4. The two chambers 112A, 112B are heated by external heating collars (not shown) fitted around the enclosure 111 or by heating cartridges (not shown) placed inside the chambers 112A, 112B. A heat exchanger 150 is fitted between the chambers 112A, 112B outside the enclosure 111. This exchanger is composed of an element made of good thermal conducting metal fixed directly onto the wall of the evaporator, a heat sink fixed onto the foregoing element and a fan fixed onto the heat sink.

The mobile element 116 is a coiled spiral spring that is closed on itself in the form of a loop that keeps its elastic properties up to 350° C. It is driven cyclically in the evaporator via a roller 152 actuated by an external motor 154. The shaft of the motor 154 enters the evaporator chamber 112A. A magnetic coupling motor can also be used, which avoids having a shaft entering the evaporator.

The injected solution SO is deposited between the coils of the spring of the mobile element 116 in the form of a thin liquid film. To increase the absorption capacity of the spring, the inside of the latter can be lined with a material easily impregnated with liquid (glass fibers for example). The system comprises a partition 114 made of thermal insulating material PTFE between the two evaporation zones. Three carrier gas GV inlet ducts are situated near to the partition 114.

An example of a CVD process implemented by means of this device is the synthesis of supraconducting layers of $YBa_2Cu_3O_7$ from the organometallic precursors $[Y(thd)_3(L_B)_x]$ ($L_B$=Lewis base, o-phenantroline for example), $Cu(thd)_2$ and $[Ba(thd)_2(L_B)_y]$ ($L_B$=Lewis base, triglyme or tetraglyme for example) dissolved in xylene (ortho, meta or para), mesitylene or diglyme These solvents present vapor pressures of about 10 Torr or more at 20° C. For this application, the supraconducting qualities of the deposition are strongly dependent on the carbon concentration in the CVD reactor and it is therefore necessary to avoid sending the organic solvent vapors to the CVD reactor.

This evaporation device was tested for evaporation of these precursors on a microbalance. For these tests, the microbalance chamber heated to CVD deposition temperature acted as CVD reactor and was connected to the outlet of the CVD precursor vapors of the evaporator. The substrate in the microbalance chamber is suspended on the arm of a balance and weighed continuously in real time. This enables the increase of the weight of the substrate to be measured over time.

This increase results from the decomposition of the precursor vapors coming from the evaporator. With this system, it has been shown that the evaporator delivers a stable precursor vapor flowrate over time for a constant solution flowrate (FIGS. 9 and 10 illustrating the linear increase of the weight of the substrate versus time).

Figure 11:
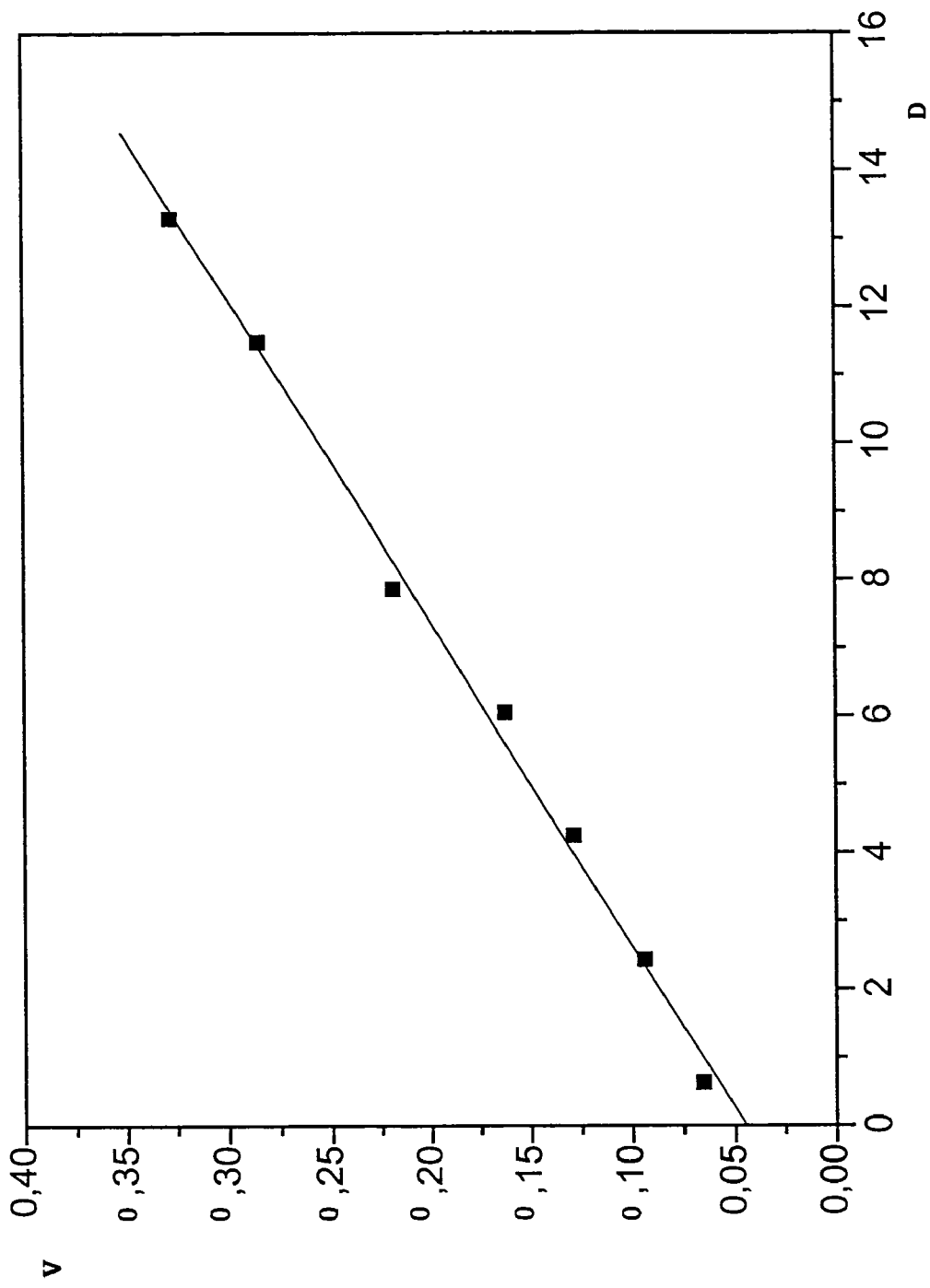
FIG. 11 shows the diagram of variation of the growth rate of the layers by CVD versus the solution flowrate.

It has also been shown that the growth rate of the layers by CVD increases linearly according to the solution flowrate for a solution of constant concentration (FIG. 11).

Figure 9:
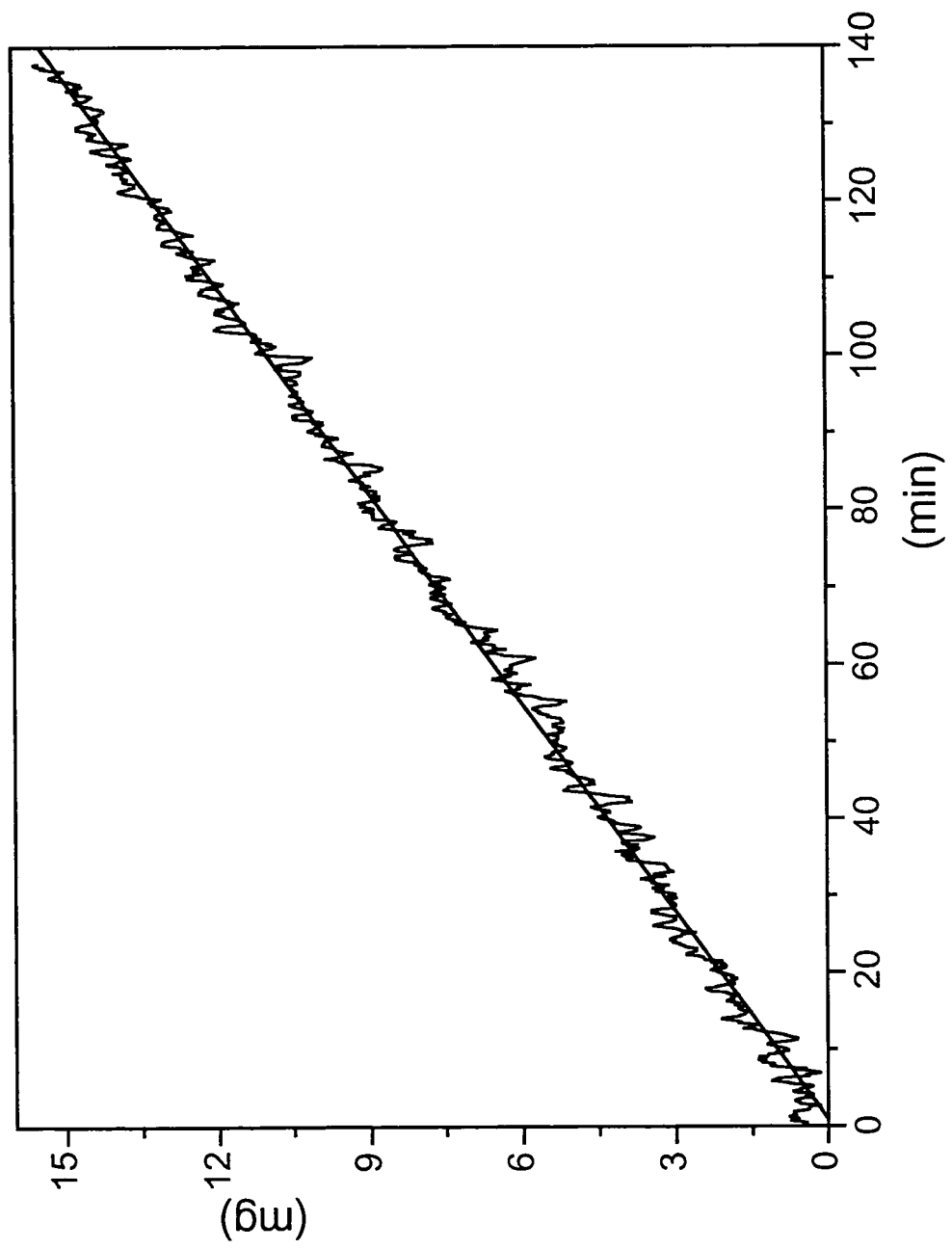
FIGS. 9 and 10 illustrate diagrams representing the increase of the mass of a substrate versus time when vapor phase decomposition of two precursors takes place.
Figure 10:
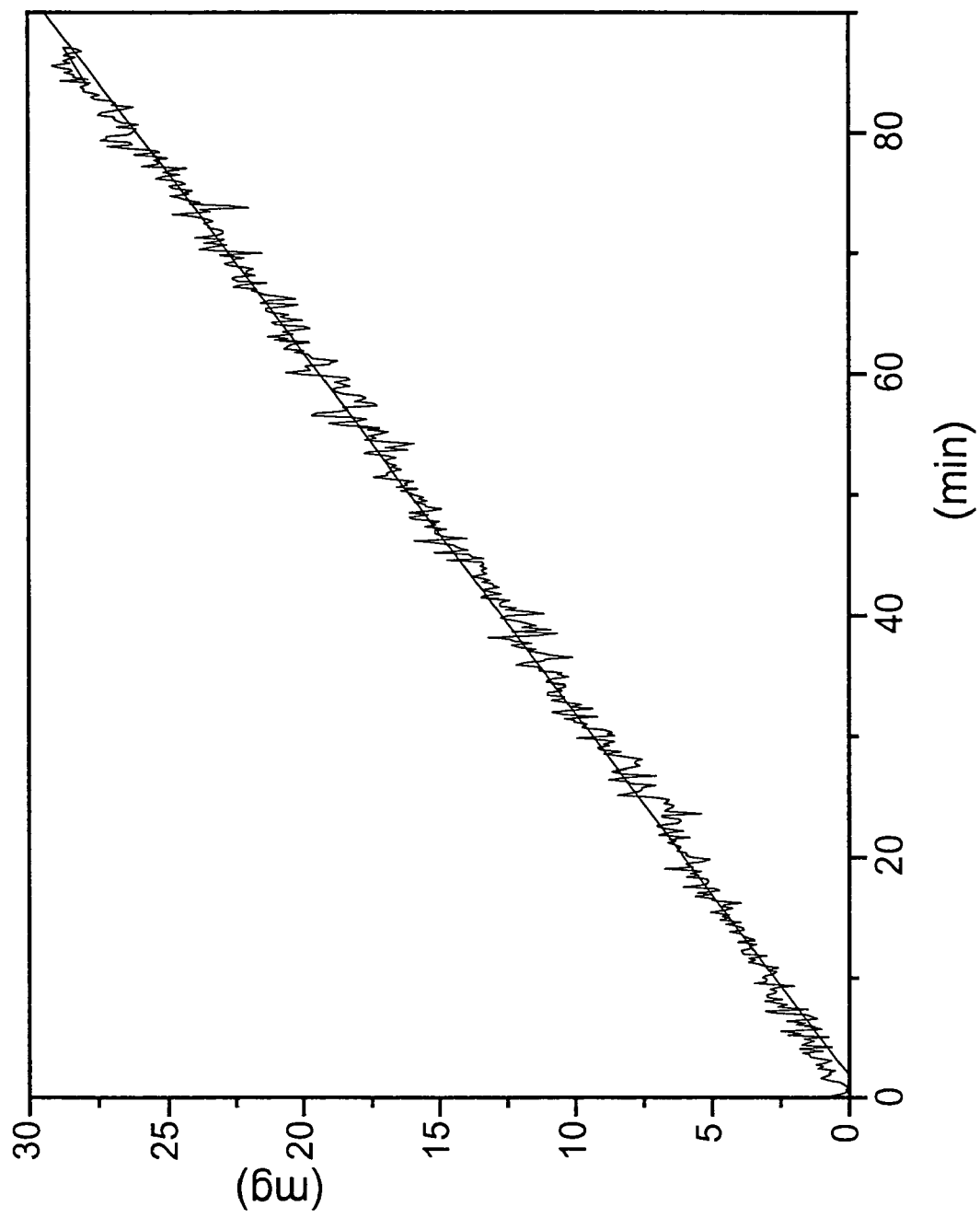

ABBREVIATIONS thd=2,2,6,6-tetramethyl-3,5-heptanedionate
triglyme=2,5,8,11-tetraoxadodecane
tetraglyme=2,5,8,11,14-pentaoxapentadecane
m-xylene=metaxylene
M=mol/l Captions of FIGS. 9, 10 and 11

FIG. 9: Increase of the weight (in mg) of the substrate versus time (in minutes) for evaporation of the Cu from a 0.1M solution of $Cu(thd)_2$ in m-xylene. The curve was obtained by means of a microbalance connected to the evaporator device.

FIG. 10: Increase of the weight (in mg) of the substrate versus time (in minutes) in vapor phase decomposition of $[Ba(thd)_2(tetraglyme)]$ evaporated from a 0.1M solution of $[Ba(thd)_2(tetraglyme)]$ in m-xylene. The curve was obtained by means of a microbalance connected to the evaporator device.

FIG. 11: Chemical vapor deposition rate v on a substrate versus the flowrate d of liquid inlet to the evaporator for a 0.1M solution of $[Ba(thd)_2(tetraglyme)]$ in m-xylene.

The invention claimed is:

1. Evaporation device of a liquid solution based on solvent and compounds or solutes inside an enclosure containing:
   evaporation zones at different temperatures which correspond to the respective evaporation temperatures of the n constituents of the solution,
   and means for separating the vapors of the solvent and of the compounds, wherein,
   the different evaporation zones are separated by separating partitions into several distinct elementary chambers enabling fractionated evaporation via outlets generating a plurality of separate flows of vapor specific to each constituent,
   the solution is injected into a first chamber subjected to the lowest temperature (T1) so as to impregnate a porous mobile element that passes through the different partitions being successively in contact with said chambers heated to increasing temperatures,
   means for injecting a neutral carrier gas in the vicinity of the partitions for control of the pressure losses of the gas flows between the different chambers, and
   means for injecting a neutral carrier gas are formed next to each separating partition by three distinct inlet ducts, two inlet ducts being respectively arranged on both sides of each separating partition and one inlet duct opening out into a hole of each separating partition, the hole allowing movement of the porous mobile element between two elementary chambers.

2. Evaporation device according to claim 1, wherein the porous mobile element is made of refractory material which keeps its mechanical properties up to the maximum temperature.

3. Evaporation device according to claim 2, wherein the mobile element is formed by a coiled spiral spring closed on itself to form a loop driven cyclically by a motor.

4. Evaporation device according to claim 1, wherein each chamber is equipped with a heating unit and with an outlet per constituent.

5. Evaporation device according to claim 4, wherein the pressure in each chamber is controlled by a pressure control system operating in conjunction with pressure reading gauges inside the chambers, and variable opening valves placed on the outlets.

6. Evaporation device according to claim 1, wherein the metal enclosure is made of stainless steel or aluminum, and the separating partitions are made of thermal insulating material each having a hole for the mobile element to pass through.

7. Evaporation device according to claim 6, wherein the means for injecting the carrier gas comprise inlet ducts to distribute the gas flows between the different chambers, the pressure losses depending on the width of the partitions and on the differential section corresponding to the clearance between the hole and the mobile element.

8. Evaporation device according to claim 1, wherein the external wall of the enclosure is equipped with a heat exchanger to prevent heat transfer between the different chambers.

9. Evaporation device according to claim 1, designed for a CVD application, where the solution contains a solvent and a precursor, wherein the outlet of the first chamber heated to ambient temperature conducts the evaporated solvent to a condensation system, whereas the outlet of the second chamber heated to a higher temperature sends the evaporated precursors to the CVD reactor.

10. Evaporation device according to claim 9, wherein a third chamber heated to a temperature higher than the temperature of the second chamber is connected to the reactor by an outlet in the case where the solution contains more than one precursor.

11. Evaporation device according to claim 9, wherein the condensation system and the reactor are equipped with a pumping system to extract the vapor flows from the chamber.

* * * * *